United States Patent
Vähä-Sipilä

(10) Patent No.: US 7,437,563 B2
(45) Date of Patent: Oct. 14, 2008

(54) SOFTWARE INTEGRITY TEST

(75) Inventor: Antti Vähä-Sipilä, Helsinki (FI)

(73) Assignee: Nokia Corporation, Espoo (FI)

( * ) Notice: Subject to any disclaimer, the term of this patent is extended or adjusted under 35 U.S.C. 154(b) by 563 days.

(21) Appl. No.: 10/667,297

(22) Filed: Sep. 19, 2003

(65) Prior Publication Data

US 2004/0111618 A1 Jun. 10, 2004

(30) Foreign Application Priority Data

Nov. 8, 2002 (WO) .................. PCT/IB02/04682

(51) Int. Cl.
*H04L 9/00* (2006.01)
*H04B 1/18* (2006.01)

(52) U.S. Cl. .............. 713/176; 713/168; 713/170; 713/156; 455/410

(58) Field of Classification Search ............ 713/168, 713/170, 176, 180; 455/558, 410
See application file for complete search history.

(56) References Cited

U.S. PATENT DOCUMENTS

| | | | | |
|---|---|---|---|---|
| 5,864,757 | A * | 1/1999 | Parker | 455/418 |
| 6,026,293 | A * | 2/2000 | Osborn | 455/411 |
| 6,216,014 | B1 * | 4/2001 | Proust et al. | 455/558 |
| 6,591,095 | B1 * | 7/2003 | Palaniswamy et al. | 455/411 |
| 6,707,915 | B1 * | 3/2004 | Jobst et al. | 380/247 |
| 6,741,848 | B2 * | 5/2004 | Timonen et al. | 455/405 |
| 6,751,731 | B1 * | 6/2004 | Binding et al. | 713/171 |
| 6,763,249 | B2 * | 7/2004 | Shirai | 455/558 |
| 6,889,212 | B1 * | 5/2005 | Wang et al. | 705/59 |
| 6,934,391 | B1 * | 8/2005 | Linkola et al. | 380/247 |
| 7,151,922 | B2 * | 12/2006 | Sashihara et al. | 455/412.2 |
| 2001/0039620 | A1 * | 11/2001 | Berry et al. | 713/193 |
| 2002/0018570 | A1 * | 2/2002 | Hansmann et al. | 380/270 |
| 2002/0077992 | A1 * | 6/2002 | Tobin | 705/65 |
| 2002/0078380 | A1 * | 6/2002 | Lin et al. | 713/201 |
| 2003/0041244 | A1 * | 2/2003 | Buttyan et al. | 713/172 |
| 2003/0061488 | A1 | 3/2003 | Huebler et al. | |
| 2003/0154409 | A1 * | 8/2003 | Morota et al. | 713/201 |
| 2003/0191945 | A1 * | 10/2003 | Keech | 713/182 |
| 2003/0211007 | A1 * | 11/2003 | Maus et al. | 422/58 |
| 2003/0224823 | A1 * | 12/2003 | Hurst et al. | 455/558 |
| 2005/0202803 | A1 * | 9/2005 | Mahalal | 455/410 |

FOREIGN PATENT DOCUMENTS

| | | | |
|---|---|---|---|
| EP | 1098543 | A1 * | 5/2001 |
| GB | 2 340 344 | | 2/2000 |
| WO | 0039958 | | 7/2000 |
| WO | WO 0039958 | A1 * | 7/2000 |
| WO | 0072149 | | 11/2000 |
| WO | WO 0072149 | A1 * | 11/2000 |
| WO | 01/33867 | | 5/2001 |
| WO | 03041022 | A1 * | 5/2003 |
| WO | WO 03041022 | A1 * | 5/2003 |

\* cited by examiner

*Primary Examiner*—Emmanuel L Moise
*Assistant Examiner*—Techane J Gergiso

(57) ABSTRACT

Integrity checking of a software module to be used in a mobile communication terminal (101) is illustrated. The terminal (101) is capable of communicating in a mobile communication system (100) and the software module is stored on a removable memory unit (103) connected to the terminal (101). The terminal (101) communicates via the mobile communication system (100) with the software provider (125). During the communication a digitally signed data block comprising a reference value for use during integrity checking of said software module is received.

2 Claims, 3 Drawing Sheets

SOFTWARE INTEGRITY TEST

CROSS REFERENCE TO RELATED APPLICATION

This application claims priority under 35 U.S.C. § 119 from International Application PCT/IB02/04682 filed Nov. 8, 2002.

TECHNICAL FIELD

The present invention relates to a method and arrangements for enabling integrity checking of software modules in a mobile communication system software environment.

BACKGROUND

Present day intelligent mobile communication devices have evolved from a first generation of digital mobile telephones that were capable of not much more than conveying voice conversations in real time. Now the devices are capable of communicating in packet switched high speed digital mobile networks and capable of processing and presenting data in much the same manner as a personal computer. The field of use now includes a diverse number of types of applications, among which games and electronic commerce are only two.

Needless to say, in order to provide users of these terminals with suitable software for use in such applications, there is a need for the terminals to be able to download software written by third party software developers as well as the terminal manufacturer. This can be achieved by way of removable memory units on which software modules can be stored. An example of such a removable memory unit is the Multi Media Card (MMC), which has become a standard for many applications in the field of portable intelligent devices.

There is, however, a problem with removable memory units such as a MMC. Because of the fact that the memory unit can be removed from the communication device, it is possible to alter the content, using e.g. a PC, and then re-insert it into the terminal and operate the terminal with modified software. Such alterations may be innocent enough. However, in many situations it is essential that the integrity of the software is maintained from the provider of the software. Needless to say, software relating to, e.g., electronic commerce is of a kind that relies on integrity.

Therefore, there is a need of a system which tests for the integrity of the software before the software is allowed to take control of the communication terminal. In one example of prior art systems, the Symbian system, this is solved by way of storing inside a protected storage area in the terminal, a cryptographic hash of the software that is to be run by processing means in the terminal. Each time the software is to be activated, i.e. run in the terminal, a hash calculation is performed on the software data and if the calculated hash does not match a hash value already stored in the terminal, the software will not be run.

However, this Symbian solution has a drawback in that it is not very flexible when a user of the terminal wishes to download additional software applications that have not been subject to the integrity check involving the storage of a hash value in the terminal. Since the additional software has been stored on the removable memory unit by, e.g., a third party software provider at the time when a user has already obtained the terminal from a terminal provider and the software being intended for use on any terminal, there can be no record of the specific software (i.e. no hash value) in the terminal itself.

Therefore, there exists a problem of the software not being allowed to run on the terminal or, as the case may be, can be run only as, e.g., "non-trusted" with less than normal capabilities for operating the terminal.

SUMMARY OF THE INVENTION

It is hence an object of the present invention to provide a solution to a problem related to the lack of flexibility of prior art as indicated above.

According to a first aspect of the present invention a method for enabling integrity checking of a software module to be used in a mobile communication terminal, said terminal capable of communicating in a mobile communication system, said software module being stored on a removable memory unit connected to the terminal, wherein the terminal communicates via the mobile communication system with the software provider, said communication including reception of a digitally signed data block comprising a reference value for use during integrity checking of said software module. This method may be done for instance by hashing the software module, resulting in a first hash value, transmitting a first identifier, associated with the memory unit, a second identifier, associated with the terminal and the first hash value via the mobile communication system to a provider of the software module, receiving, from the provider of the software module, a data block comprising a digital signature and further data associated with the memory unit and the terminal, analyzing the received data block, comprising verification of the digital signature and comparison of said further data with said first and second identifiers, and storing the received data block comprising the digital signature, thereby providing a reference value for use during integrity checking of said software module. The transmission of the first identifier may include transmission of a memory unit serial number or a software module identification number.

The transmission of the second identifier may include transmission off an international mobile station equipment identity code.

According to a second aspect of the present invention, a mobile communication terminal comprises means for enabling integrity checking of a software module to be used in the terminal, said terminal capable of communicating in a mobile communication system, said software module being stored on a removable memory unit connected to the terminal, wherein said terminal comprises means for communicating via the mobile communication system with the software provider, said means for communication including means for receiving a digitally signed data block comprising a reference value for use in means for integrity checking of said software module. The terminal may comprise means for hashing the software module, arranged to provide a first hash value, means for transmitting a first identifier, associated with the memory unit, a second identifier, associated with the terminal and the first hash value via the mobile communication system to a provider of the software module, means for receiving, from the provider of the software module, a data block comprising a digital signature and further data associated with the memory unit and the terminal, means for analyzing the received data block, comprising means for verification of the digital signature and comparison of said further data with said first and second identifiers, means for storing the received data block comprising the digital signature, arranged to provide a reference value for use during integrity checking of said software module. The means for transmitting the first identifier may include means for transmitting a memory unit serial number or a software module identification number.

The means for transmitting the second identifier may include means for transmitting an international mobile station equipment identity code.

The invention provides a method and a mobile communication terminal for enabling integrity checking of a software module to be used in the terminal. The terminal is capable of communicating in a mobile communication system and the software module is stored on a removable memory unit connected to the terminal. The terminal communicates via the mobile communication system with the software provider. During the communication a digitally signed data block comprising a reference value for use during integrity checking of said software module is received.

In some more detail, according to a preferred embodiment of the invention, the method commences by a hashing step during which the software module itself is subject to a hashing step, resulting in a first hash value.

Then is performed transmission of the first hash value as well as a first identifier, which is associated with the memory unit in the form of, e.g., a unit serial number or a software module identification code. A second identifier, which is associated with the terminal in the form of, e.g., a terminal serial number, is also transmitted. The transmission is performed via the mobile communication system to a provider of the software module.

The method continues with the step of receiving, from the provider of the software module, a data block comprising a digital signature and further data. The further data is associated with the memory unit and the terminal and may, e.g., be in the form of the first and the second identifier.

After the reception of the data block, this is subject to a step of analysis. The analysis comprises a verification of the digital signature and comparison of said further data with said first and second identifiers.

The received data block comprising the signature is then stored, thereby providing a reference value for use during integrity checking of the software module.

In other words, an effect of the invention is that, when a memory unit, such as a MMC card, is inserted to the device, it is "tagged" to the extent that the memory unit is usable only in connection with the terminal in which it was initially connected to. After this "tagging" action, simply copying all software or data that is stored on the card onto another memory unit does not enable another terminal to make full use of the software. That is, the only combination of hardware and software that will result in the device accepting the software is the combination of the unaltered version of the software module, the original memory module and the device with which it was tagged.

An advantage of the invention is that it is more flexible than prior art integrity checking solutions where the integrity checking involves use of information that is already stored in a protected storage area of the terminal.

Another advantage of the invention is that it allows reliable copy protection of a software module, since a user terminal into which a software module is to be loaded communicates with a provider of the software and, in effect, asks for permission to use the module.

PREFERRED EMBODIMENTS

Figure 1:
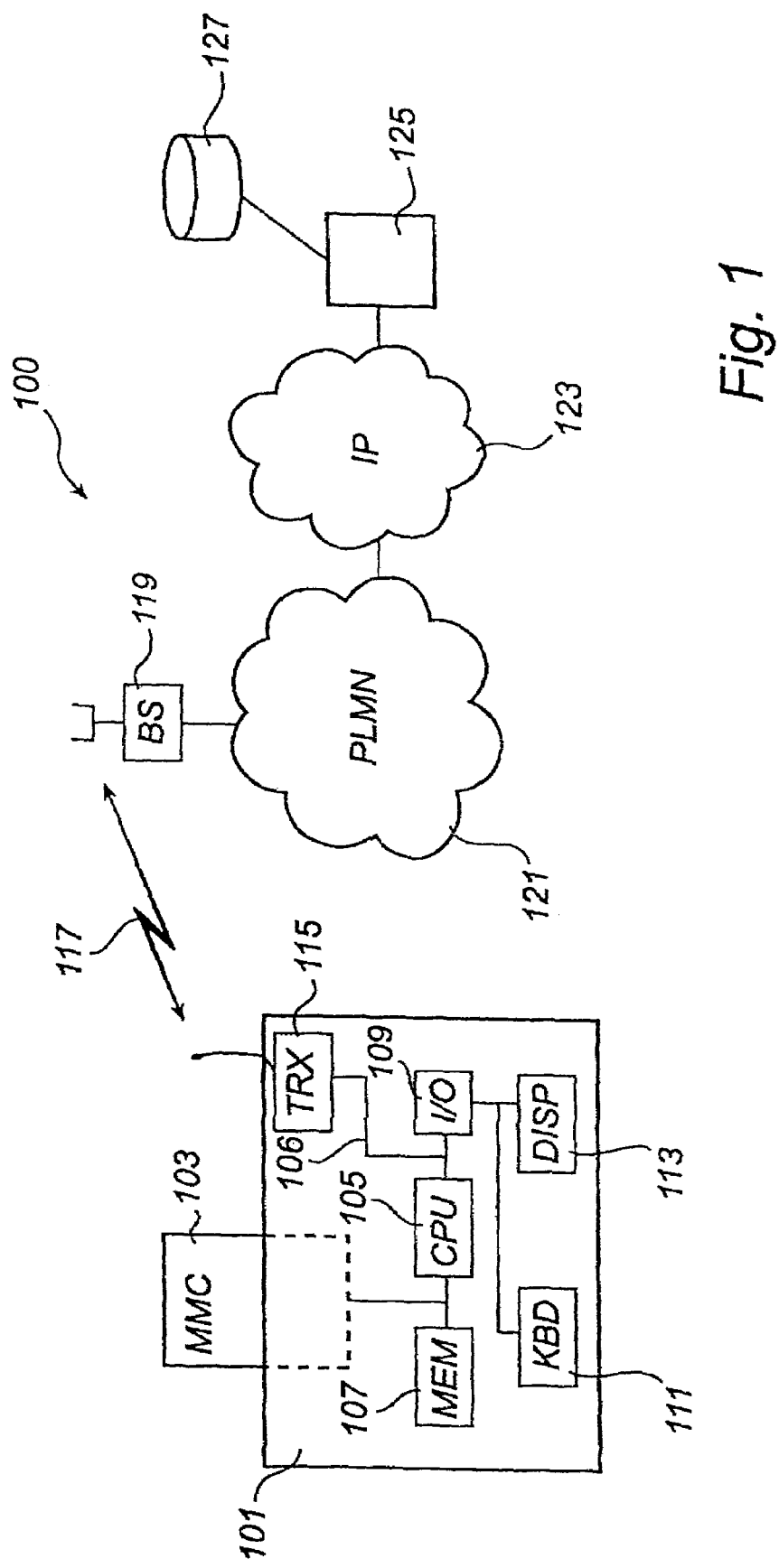
FIG. 1 shows schematically a block diagram of a mobile communication system including an embodiment of an mobile communication terminal according to the present invention.

Below will follow a description of a method for enabling integrity checking according to the present invention. The embodiment is illustrated by way of a schematic block diagram of a communication system 100 in FIG. 1 and flow charts in FIGS. 2 and 3.

The communication system 100 comprises a mobile communication terminal 101, which includes a number of means for operating the terminal in the system 100. A processing unit 105 is connected via a bus 106 to a removable memory unit 103, an internal memory unit 107, an input/output unit 109 and a radio transceiver unit 115. The input/output unit 109 in turn conveys information from a keyboard ill and a display 113. The radio transceiver unit 115 is capable of establishing a radio connection with a radio base station 119 via an air interface 117 in a radio communication network 121. Information is exchanged between the terminal 101 and a software provider server 125 having a database 127 via a data communication network 123 that is connected to the radio communication network 121.

As the person skilled in the art will realize from the description, the embodiment is one that may be implemented on a Symbian platform, which is in use in a number of mobile communication terminals, such as the terminal 101 described above, from a multitude of manufacturers. Moreover, the embodiment of the method utilizes a removable software module, such as the removable memory unit 103 in FIG. 1, in the form of a Multi Media Card (MMC), also known to the person skilled in the art. However, it shall be stressed that the invention is not limited to implementation in a Symbian system using a MMC card. Other combinations of hardware and software platforms are possible, as the person skilled in the art will realize.

Figure 2:
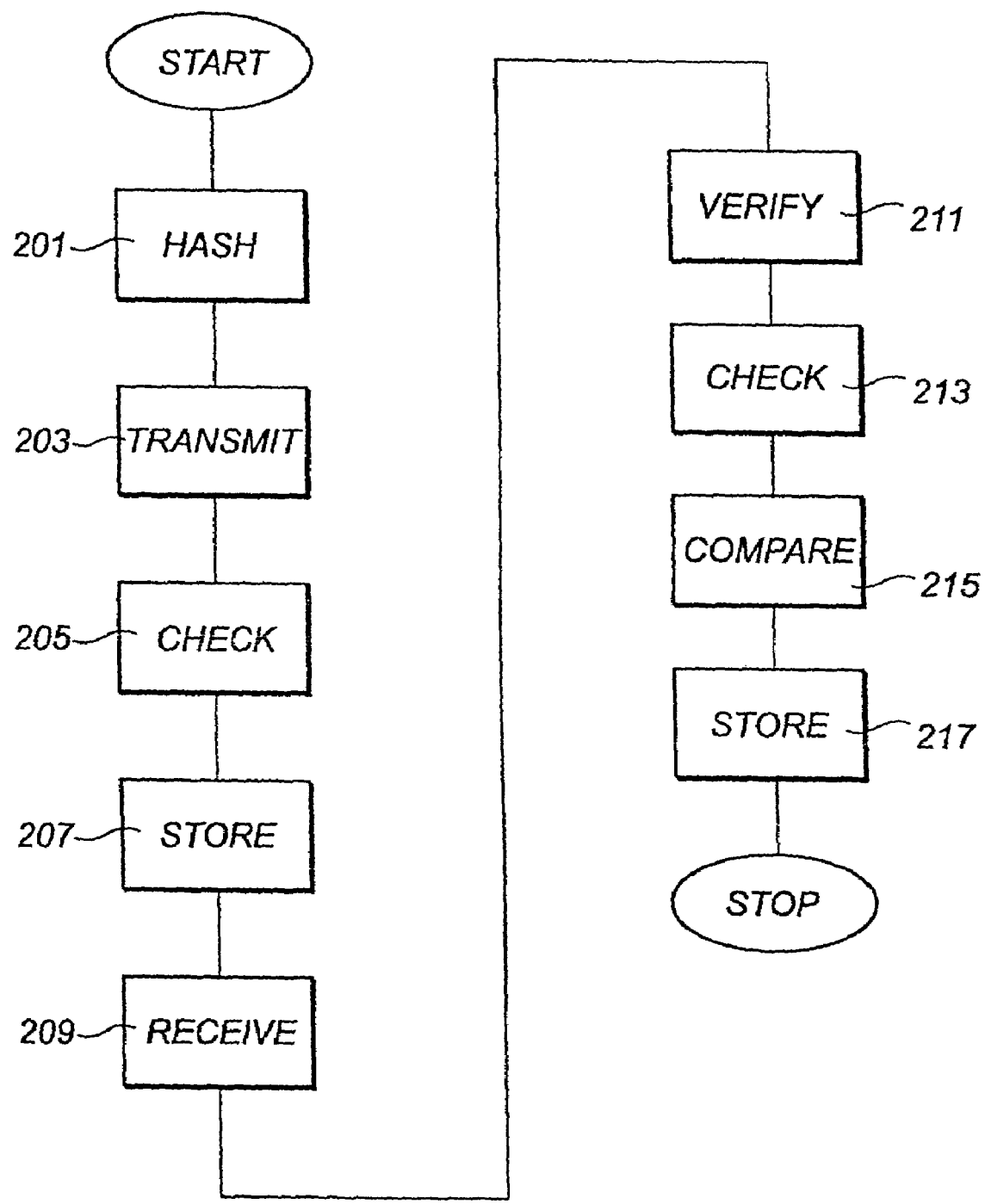
FIG. 2 shows a flow chart of an embodiment of a method according to the present invention.

Referring now to FIGS. 1 and 2, when a removable memory card 103 is inserted into a Symbian platform security enabled device, i.e. the terminal 101, a software installation file is executed. The installation software may reside either on the MMC card or in the device itself.

In an initial hashing step 201, the installation function hashes the executables, i.e. the software module, on the MMC card 103 along with the MMC serial number of the MMC card 103.

In an transmission step 203 the installation file sends the international mobile station equipment identity (IMEI) code of the terminal 101, the MMC serial number of the removable memory unit 103 and the hash value resulting from the hashing step 201, via the mobile communication system 100 to the receiving server 125 at the software provider.

Then, in a checking step 205, the software provider checks if it really is the true issuer or provider of a MMC 103 with this MMC serial number, containing the software module corresponding to the first hash value. In other words, it is made sure that the received first hash value matches a hash value of a software module provided by the provider. If the check is successful, the provider digitally signs the received information and returns the result in a key file to the terminal 101 via the mobile communication system 100.

In a storage step 207, the software provider server 125 stores the MMC serial number relationship in its database 127. This will have the effect that the software provider will not sign any other, i.e. later, request for the same MMC serial number and same software module, and thereby "tagging" the software module as discussed above.

The key file arrives in a reception step 209 in the mobile communication terminal 101 and is passed on to the software installation software function running in the terminal 101, which is running with full privileges.

In a verification step 211 the signature on the key file is verified and a check is made in a checking step 213 that the IMEI code matches the IMEI code of the device. The software installation function also compares, in a comparison step 215, the MMC serial number in the received key file and the MMC serial number of the currently connected MMC card 103.

The signed key file is then stored, in a storage step 217, into the Symbian platform security MMC integrity protection registry, preferably realized in the internal memory 107 of the terminal 101.

As a contrast to prior art, where this is done when installing software on the MMC 103, now the software provider's software data populates the registry just as if the files had been installed on the MMC 103. But since they are already present there, the only action that is performed is populating the integrity registry.

At this point, integrity checking of the software is enabled. Hence, when starting a program from the MMC 103 a check for integrity can be performed according to, e.g., the following steps, continuing with reference to FIG. 3.

In a hashing step 301, the platform security system, i.e. Symbian software functions, hashes the target executable. It notices that this hash was inserted in this special fashion, and also hashes the MMC serial number of the currently inserted MMC card 103 with the executable.

In a checking step 303 a check is made whether or not the hash value matches the previously stored hash value in the signed key file. A check is also made whether the MMC identifier matches the stored signed identifier in the key file. If the values match, the executable code is allowed to run on the terminal 101, as indicated by the execution step 305.

The invention as described above provides a simple and effective way of enabling an integrity check of a software module. For example, if the software module stored in the removable memory unit 103, e.g. a MMC, has been copied onto another MMC and that other MMC is inserted to a terminal 101 that has been tagged with the original MMC, it's unique MMC serial number is not the same. Hash verification fails and the software module will not be allowed to run.

Also, if the MMC is connected to a second terminal (not shown) after it has been "tagged" when initially connected to a first terminal 101, the software provider will not sign the request for a signed key file.

Also, if the MMC is copied before "tagging" it, the MMC serial number of the card that it has been copied onto (not shown) is not in the software provider server database 127 of sold cards, so the software provider will not honor the MMC serial number.

Also, if a "software pirate" is producing a plurality of cards (not shown) with one and the same MMC serial number, only the first "tagging" request is honoured by the software provider.

Finally, the signed reply from the software provider (the tagging message, i.e. the key file) cannot be forged because it contains the IMEI of the target mobile terminal and is signed by the software provider.

Figure 3:
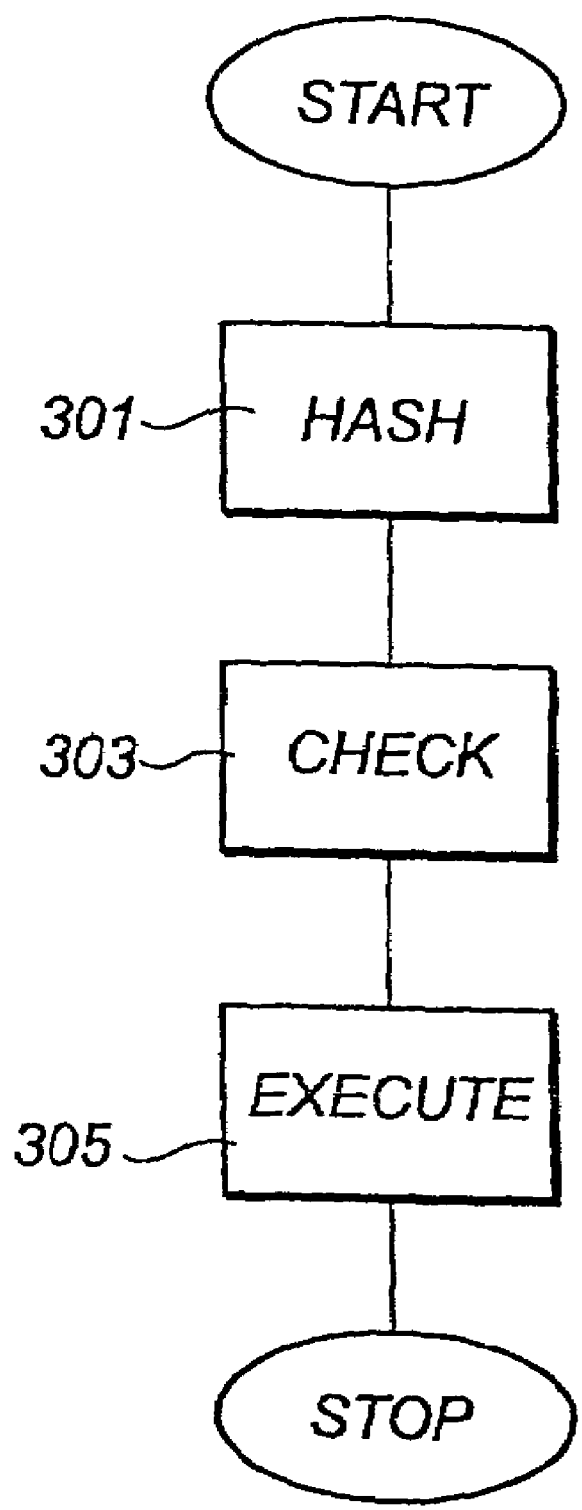
FIG. 3 shows a flow chart of an integrity checking procedure.

It should be realized that the steps that are shown in FIGS. 2 (excluding steps 205 and 207) and 3 that are carried out on the mobile communication terminal of FIG. 1 are carried out by the CPU 105 in conjunction with the other elements shown in the terminal 101 including the memory 107, the transceiver 115, the MMC 103, etc. Thus, it will be realized that such means for carrying out the steps of FIGS. 2 and 3 are typically carried out in software coded in the memory 107 of the terminal 101 and as executed by the CPU 107 in conjunction with the other elements of the terminal 101 and operating within the system 100 of FIG. 1. Thus, all of the steps of FIG. 2 (except for steps 205 and 207) are carried out in the terminal 101 as well as all of the steps of FIG. 3 using the hardware and stored software coded according to the above description.

The invention claimed is:

1. A method, comprising:
    enabling integrity checking of a software module to be used in a mobile communication terminal, said terminal communicating in a mobile communication system, said software module already stored on a removable memory unit connected to the terminal and ready for use except, before allowing the software module to take control of the terminal, the terminal communicates via the mobile communication system with a software provider, said terminal comprising a processor configured to carry out said enabling by:
    hashing the software module on the removable memory unit, resulting in a first hash value,
    transmitting by said terminal of identifying information concerning said terminal and said memory unit to said software provider, wherein said transmitting of identifying information comprises transmitting a first identifier, associated with the memory unit, a second identifier, associated with the terminal and the first hash value via the mobile communication system to said software provider,
    receiving by said terminal from said software provider a digitally signed data block comprising a reference value for use during integrity checking of said software module, and said data block comprising a digital signature and further data associated with the memory unit and the terminal,
    analyzing the received data block, comprising verification of the digital signature and comparison of said further data with said first and second identifiers,
    if the comparison of said further data matches with said first and second identifiers, storing the received data block comprising the digital signature, thereby providing the reference value for use during integrity checking of said software module; and
    wherein said integrity checking further comprises hashing the software module for providing a second hash value using the reference value, and checking whether or not the second hash value matches the first hash value and if the second hash value matches the first hash value allowing the software module to run on and take control of the mobile communication terminal.

2. An apparatus, comprising:
    a processor for enabling integrity checking of a software module to be used in said apparatus, said apparatus for communicating in a mobile communication system, said software module already stored on a removable memory unit for connection to the terminal and ready for use except, before allowing the software module to take control of the apparatus, the terminal communicates via the mobile communication system with a software provider, said processor enabling said integrity checking a device for hashing the software module, resulting in a first hash value;
    a transmitter for transmitting identifying information concerning said apparatus and said memory unit to said software provider wherein transmittal of said identifying information comprises transmittal of a first identifier associated with the memory unit, a second identifier associated with the apparatus and the first hash value via the mobile communication system to said software provider;

a receiver for receiving, from the software provider, a data block comprising a digital signature and further data associated with the memory unit and the terminal;

said processor for analyzing the received data block, comprising verification of the digital signature and comparison of said further data with said first and second identifiers;

a memory device for storing the received data block comprising the digital signature, thereby providing a reference value for use during integrity checking of said software module for a receiver for receiving a digitally signed data block comprising a the reference value for use during integrity checking of said software module; and wherein said integrity checking comprises hashing the software module for providing a second hash value using the reference value, and checking whether or not the second hash value matches the first hash value and if the second hash value matches the first hash value allowing the software module to run on and take control of the apparatus.

* * * * *

UNITED STATES PATENT AND TRADEMARK OFFICE
CERTIFICATE OF CORRECTION

| | | |
|---|---|---|
| PATENT NO. | : 7,437,563 B2 | Page 1 of 1 |
| APPLICATION NO. | : 10/667297 | |
| DATED | : October 14, 2008 | |
| INVENTOR(S) | : Antti Vähä-Sipilä | |

It is certified that error appears in the above-identified patent and that said Letters Patent is hereby corrected as shown below:

In column 6 at line 56, please delete "terminal" and insert --apparatus-- therefor.
In column 6 at line 56, after "use" please insert --after said connection--.
In column 6 at line 58, please delete "terminal" and insert --apparatus-- therefor.
In column 6 at line 60, please delete "said processor" and insert --wherein said processor, in-- therefor.
In column 6 at lines 60-61, please delete "a device for hashing" and insert --hashes-- therefor.
In column 7 at line 6, please delete "terminal" and insert --apparatus-- therefor.
In column 8 at line 2, please delete the word "a".
In column 8 at line 7, please delete "using the reference value".

Signed and Sealed this

Seventh Day of April, 2009

JOHN DOLL
*Acting Director of the United States Patent and Trademark Office*